(12) United States Patent
Spolyar

(10) Patent No.: US 9,133,870 B2
(45) Date of Patent: Sep. 15, 2015

(54) ADJUSTABLE TOWER STUD ASSEMBLY

(71) Applicant: Ford Global Technologies, LLC, Dearborn, MI (US)

(72) Inventor: David James Spolyar, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 13/855,937

(22) Filed: Apr. 3, 2013

(65) Prior Publication Data

US 2014/0301804 A1 Oct. 9, 2014

(51) Int. Cl.
*F16B 5/02* (2006.01)
*B60R 9/04* (2006.01)

(52) U.S. Cl.
CPC .............. *F16B 5/0275* (2013.01); *B60R 9/04* (2013.01); *F16B 5/0233* (2013.01); *Y10T 29/49948* (2015.01)

(58) Field of Classification Search
CPC .... F16B 5/0225; F16B 5/0275; F16B 5/0283; F16B 5/0621; B60R 9/04
USPC .............. 403/43, 45, 48, 167, 168, 408.1; 224/325, 326
See application file for complete search history.

(56) References Cited

U.S. PATENT DOCUMENTS

| 6,158,637 A | 12/2000 | Fisch et al. |
| 6,902,229 B2 | 6/2005 | Bradbrook et al. |
| 7,591,403 B2 | 9/2009 | Binder et al. |
| 7,980,437 B2 | 7/2011 | Binder et al. |
| 2009/0020573 A1 | 1/2009 | Binder et al. |
| 2013/0299539 A1* | 11/2013 | Bocker et al. ................. 224/309 |

FOREIGN PATENT DOCUMENTS

| DE | 31 33 932 | * | 3/1983 | ................ B60R 9/04 |
| DE | 10 2005 014 | * | 9/2006 | ................ B60R 9/04 |
| EP | 2 532 568 | * | 12/2012 | ................ B60R 9/04 |

* cited by examiner

*Primary Examiner* — Michael P. Ferguson
(74) *Attorney, Agent, or Firm* — Raymond L. Coppiellie; Brooks Kushman P.C.

(57) ABSTRACT

An adjustable tower stud assembly is disclosed for securing an object, such as a roof rack, to an external panel such as the roof of a vehicle. The object requires more support than can be provided by the external panel and it is also connected to a sub-surface support. Upper and lower collared studs are connected by a threaded connection that allows the length of the tower stud assembly to be adjusted. Stops on a lower collar ground the tower stud assembly to the sub-surface support after the tower stud assembly is adjusted to the proper length.

9 Claims, 3 Drawing Sheets

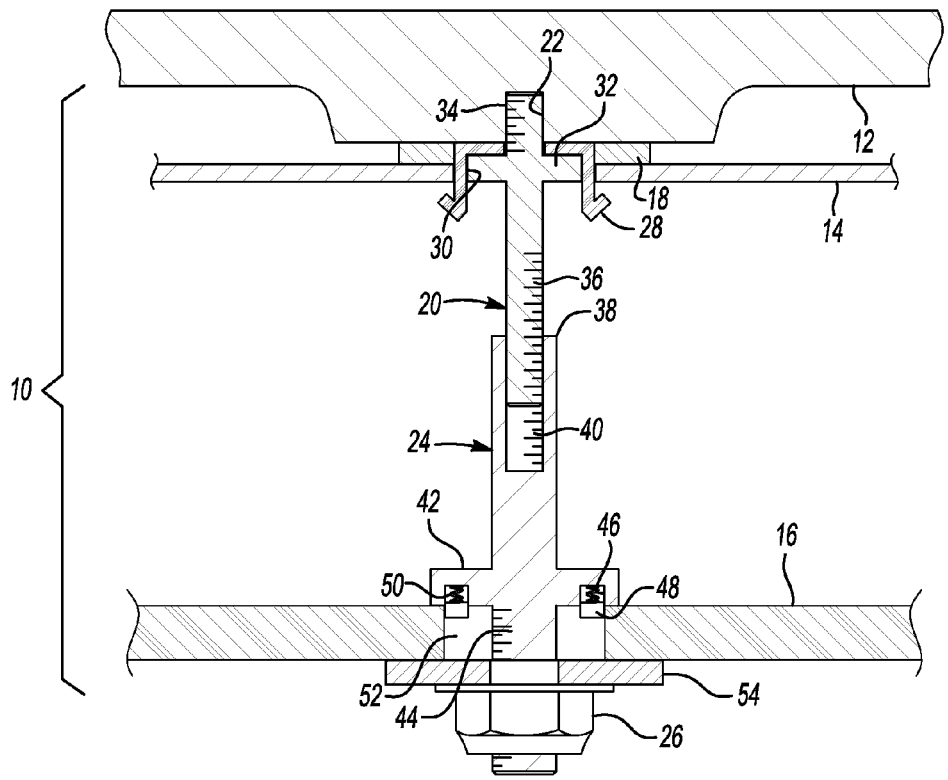
Fig-4
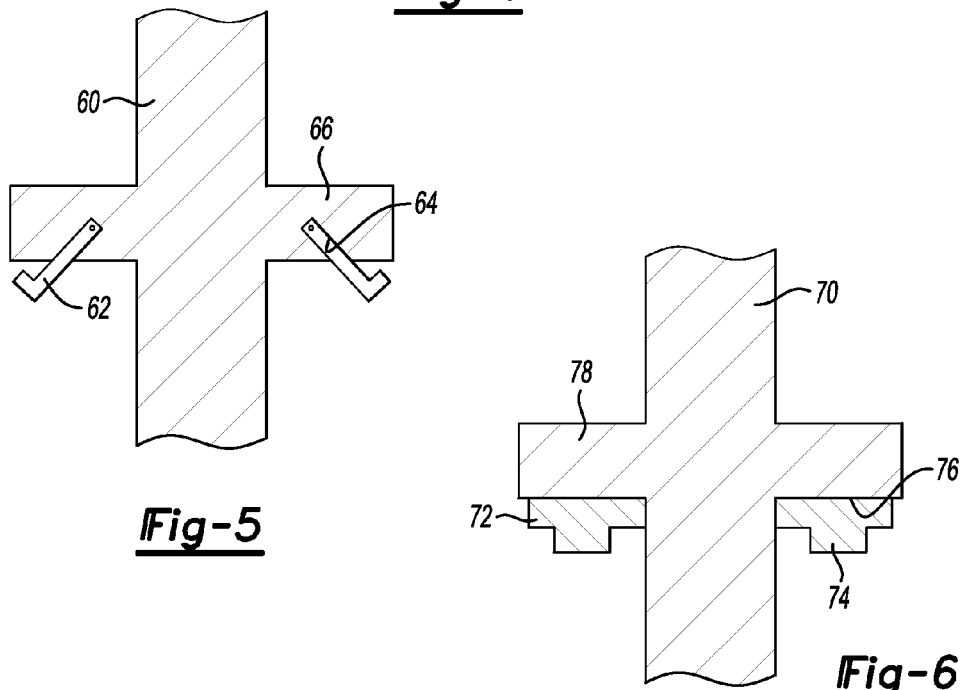
Fig-5
Fig-6

US 9,133,870 B2

ADJUSTABLE TOWER STUD ASSEMBLY

TECHNICAL FIELD

This disclosure relates to fastening systems and assemblies that are used to attach accessories, such as a roof rack or deck lid rack, to both an exterior surface and a sub-surface mounting structure.

BACKGROUND

Roof racks are popular accessories for land vehicles that provide an alternative approach to transporting large objects on the vehicle. A roof rack may comprise a pair of parallel rails that extend longitudinally along the outer panel of the roof. Alternatively, the roof rack may include more than two rails and transverse rails. Similar racks may be installed on a deck lid of a sedan or coupe style vehicle.

Depending upon the design of the roof, the outer panel of the roof may be spaced from a sub-structure mounting plate. For example, the sub-structure mounting plate may be spaced 20-60 mm away from the outer panel of the roof. A design height may be specified within the above range but substantial variation from the design height may be encountered. Fixed height fasteners may be used to secure the roof rack to the sub-structure mounting plate, but the variations due to manufacturing tolerances from the design height may adversely affect product quality.

Tightening the roof rack fastener when the distance is less than the design height may dent or deform the outer roof panel. Conversely, when the distance between the outer roof panel and the sub-structure mounting plate is greater than the design height, tightening the fastener may not result in the roof rack being fully seated to the outer panel of the roof. Poor fit or water leaks may result if the roof rack is not fully seated.

Similar problems are encountered with other parts, for example instrument panels, where an accessory or other object is attached to a surface and sub-surface structure. The primary support for the accessory is the sub-surface structure that is spaced inboard from the surface. Variations in the spacing between the surface and the sub-surface structure may create fit and finish or sealing problems.

This disclosure is directed to solving the above problems and other problems as summarized below.

SUMMARY

According to one aspect of this disclosure a fastener assembly is provided for attaching an object to an external panel and to sub-structure. A first stud is attached to the object and has a first threaded shaft that extends from the object through an opening in the external panel. A second stud defines a threaded hole in a first end for receiving the first threaded shaft. The second stud has a second threaded shaft on a second end opposite the first end, and a collar intermediate the threaded hole and the second threaded shaft. A stop is formed on the collar that engages a slot defined by the sub-structure. The second stud is rotated in one direction to increase an extent that the first stud protrudes from the threaded hole until the stop engages the slot and continued rotation of the second stud in the one direction draws the object toward the external panel.

According to other aspects of this disclosure, the fastener assembly may further comprise a seal compressed between the object and the external panel when the second stud is rotated in the one direction after the stop engages the slot during the rotation of the second to draw the object toward the external panel. The seal may be compressed to a predetermined extent between the object and the external panel, and wherein the continued rotation of the second stud draws the object toward the external panel to that predetermined extent.

A prevailing torque nut may be assembled to the second end of the second stud that is turned at a first level of torque when initially assembled to the second stud until the stop engages the slot and is then turned at a second level of torque that is greater than the first level of torque thereafter as the object is drawn toward the external panel.

The threaded hole and the second threaded shaft may be threaded in the opposite direction as compared to the first threaded shaft. A third threaded shaft may be provided on the first stud that is received in a threaded receptacle defined by the object. A retention clip may be assembled to the first stud over a collar formed on the first stud that extends through the opening in the external panel and retains the fastener assembly and object on the external panel. The retention clip inhibits the second stud from drawing the object toward the external panel until the stop engages the slot.

According to another aspect of this disclosure, an article is provided that includes a receiving member having an external panel, an object attached to the external panel and to a sub-surface structure and a tower stud assembly. The tower stud assembly includes a first stud assembled to the object that connects the object to the external panel through the first opening. A second stud is assembled by a first threaded connection to the first stud and extends through the opening in the sub-surface structure. A stop is provided on the second stud that that is received in the second opening to stop rotation of the second stud. A nut is assembled to the second stud that is turned to rotate the second stud to cause the tower stud assembly to be extended to take up a portion of the space defined between the external panel and the sub-surface structure until the stop engages the second opening. Continued rotation of the nut after engaging the sub-surface structure draws the object to the external panel.

The nut may be a prevailing torque nut at a first level of torque when initially assembled to the second stud and is subsequently turned at a second level of torque that is greater than the first level of torque.

According to other aspects of this disclosure as it relates to the article, a seal may be compressed between the object and the external panel when the second stud is rotated in a first direction after the stop engages the second opening during continued rotation of the second stud in the first direction that draws the object toward the external panel. The seal is designed to be compressed to a predetermined extent between the object and the external panel. Continued rotation of the second stud draws the object toward the external panel by the same predetermined extent.

The first threaded connection may be threaded in a first direction with the nut being connected to the second stud by a second threaded connection, wherein the first threaded connection and second threaded connection are threaded in opposite rotary directions.

A retention clip may be assembled to the first stud over a collar formed on the first stud that extends through the opening in the external panel and retains the tower stud assembly and object on the external panel. The retention clip inhibits the second stud from drawing the object toward the external panel until the stop engages the second opening.

According to another aspect of this disclosure, a method is disclosed for attaching an object to a panel that defines a first opening and a sub-surface support structure that defines a second opening. The method comprises assembling the object to the panel and inserting a tower stud through the first opening and the second opening. The tower stud includes a first collar stud having a first end that is secured to the object and a second end that has a threaded portion. A second collar stud includes a threaded bore on a first end, an intermediate collar, and a threaded shaft of a second end. A nut is attached to the threaded shaft of the second end of the second collar. The nut is turned to rotate the second collar stud relative to the first collar stud to extend the length of the tower stud until the intermediate collar is grounded to the sub-surface support structure. The nut is then turned to draw the tower stud towards the sub-surface support structure until the intermediate collar is tightened against the sub-surface support structure.

According to other aspects of the method, a seal may be assembled to the first collar stud between the object and the panel. A stop element may be disposed on the intermediate collar to engage the second opening and ground the intermediate collar to the sub-surface support structure. The seal is compressed as the tower stud is drawn towards the sub-surface support structure. The stop element extends a first distance from the intermediate collar that corresponds to a second distance that the seal is compressed.

The method may also include assembling a clip to the first collar stud that is inserted through the first hole in the panel to retain the tower stud in the first hole.

The threaded portion on second end of the first collar stud may be reversely threaded and the threaded bore on the first end of the second collar stud may also be reversely threaded. The reversely threaded portion on the first collar stud is turned by the reversely threaded bore of the second collar stud by turning the nut to extend the length of the tower stud. The step of turning the nut to extend the length of the tower stud may be performed at a first level of torque and the step of turning the nut to draw the tower stud towards the sub-surface supporting structure may be performed at a second level of torque that is greater than the first level of torque.

The above aspects of this disclosure and other aspects will be described in greater detail below with reference to the attached drawings.

BRIEF DESCRIPTION OF THE DRAWINGS

FIG. 4 is a cross-section view of the tower stud assembly in the extended position with the assembly secured to the sub-surface support and the seal compressed.

FIG. 5 is a fragmentary cross-section view of an alternate leaf spring stop provided on a sub-surface engaging collar.

FIG. 6 is a fragmentary cross-section view of an alternate molded plastic stop provided below the sub-surface engaging collar.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
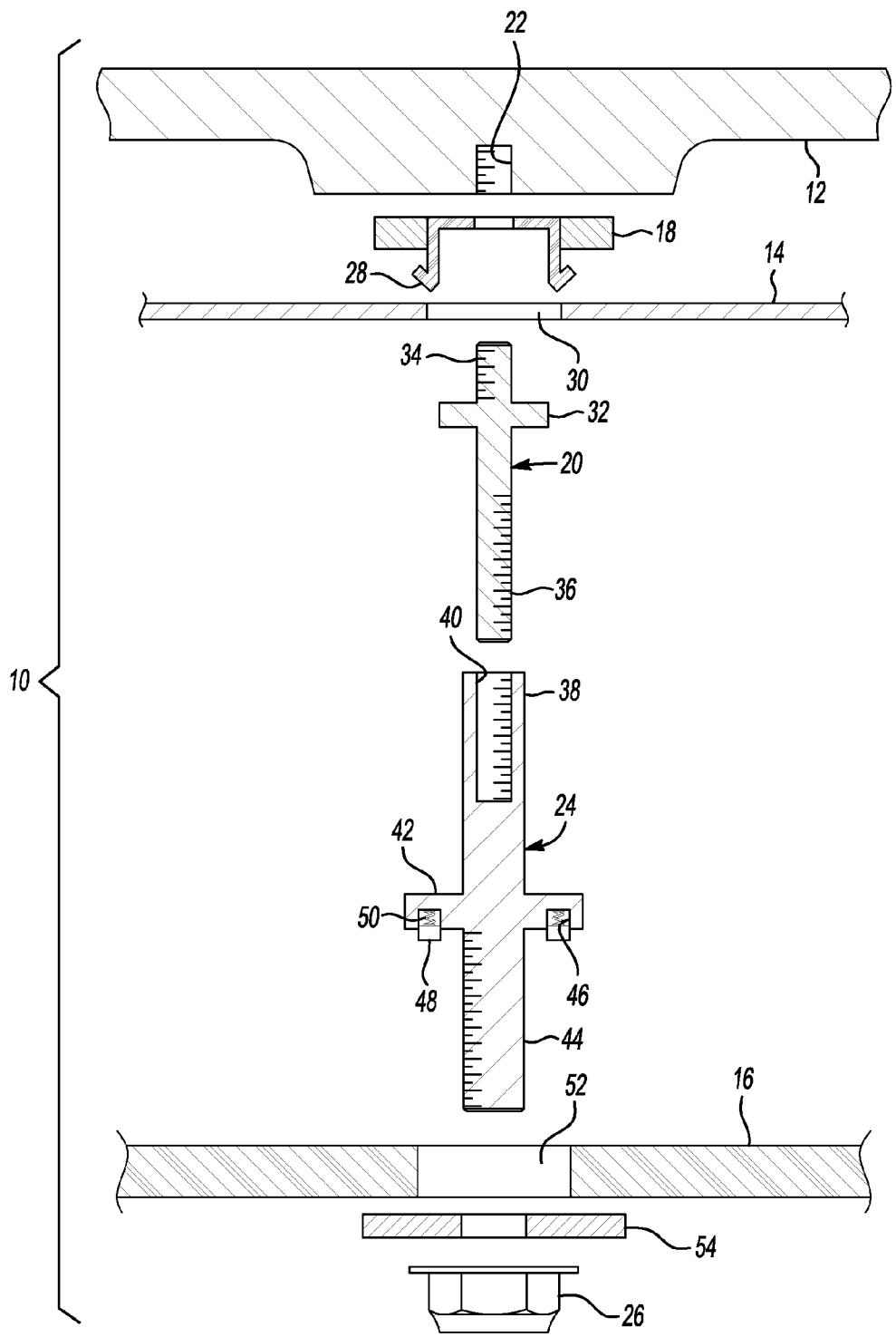
FIG. 1 is an exploded cross-section view of a tower stud assembly.

Referring to FIG. 1, a tower stud assembly 10 is illustrated that is used to connect a roof rack 12 to a roof 14. The roof rack may be another type of object that is attached to an external panel, such as the roof 14. The object or roof rack 12 is also connected to a sub-surface support 16, or sub-structure, that provides additional rigidity and strength to support the object or roof rack 12.

A seal 18 is provided between the roof rack 12 and the roof 14 that functions to provide a sealing element between the roof rack 12 and the roof 14 that prevents water from seeping inside the roof 14. An upper collared stud 20 forms a part of the tower stud assembly 10. The upper collared stud 20 may also be referred to as a first stud and it should be understood that the terms upper and lower as used herein refer to the orientation of the parts as illustrated and is not intended to limit the orientation of the tower stud assembly 10 that may be oriented to be assembled to either side of a horizontal surface or vertical surface or any other angular oriented surface. The upper collared stud 20 is received in a threaded receptacle 22, or hole, formed in the object or roof rack 12. A lower collared stud 24, or second stud, forms a second part of the tower stud assembly and is assembled to the upper collared stud 20. A prevailing torque nut 26 is used to secure the tower stud assembly 10 to the sub-surface support 16.

A clip 28 that may comprise a plastic clip is assembled to the seal 18. The clip is assembled over the upper collared stud 20 and may be used to hold the seal 18 in position between the roof rack 12 and the roof 14. The clip 28 is inserted with the tower stud assembly 10 into an opening 30 defined in the roof 14. The clip 28 holds the tower stud assembly 10 and seal 18 in the opening 30. An upper stud collar 32 functions to hold the clip 28 and seal 18 together. A threaded upper shaft 34 of the upper collared stud 20 is screwed into the threaded receptacle 22 in the roof rack 12 prior to assembling the roof rack 12 to the roof 14. The upper collared stud 20 also includes a reversely threaded lower shaft 36.

An upper end of the lower collared stud 24 defines a reversely threaded bore 40 that is adapted to receive the reversely threaded lower shaft 36 of the upper collared stud 20. The reversely threaded lower shaft 36 and reversely threaded bore 40 make up a reversely threaded connection that functions to permit the upper collared stud 20 to be extended by rotating the lower collared stud 24. Operation of the reversely threaded connection will be described in greater detail with reference to FIGS. 2-4 below.

The lower collared stud 24, may also be referred to as a second collared stud, includes a lower stud collar 42. A threaded lower shaft 44 is provided on the lower end, as shown in FIG. 1, of the lower collared stud 24 below the lower stud collar 42. The prevailing torque nut 26 is assembled to the threaded lower shaft 44. The lower stud collar 42 includes one or more receptacles 46. In the illustrated embodiment, two receptacles 46 are provided on the lower stud collar 42. The receptacle 46 may be a recess or a blind hole. At least one stop 48 is assembled with a spring 50 into each of the receptacles 46. The springs 50 bias the stops 48 into an extended position.

The sub-surface support 16 defines a slot 52 through which the threaded lower shaft 44 of the lower collared stud 24 extends. The slot 52 interacts with the stops 48, as will be more fully described with reference to FIGS. 2-4 below. A washer 54 may be provided on the lower side of the sub-surface support 16, as shown in FIG. 1, to spread the force applied by the prevailing torque nut 26 as the torque nut 26 is used to extend and secure the tower stud assembly 10 to the sub-surface support 16.

Figure 2:
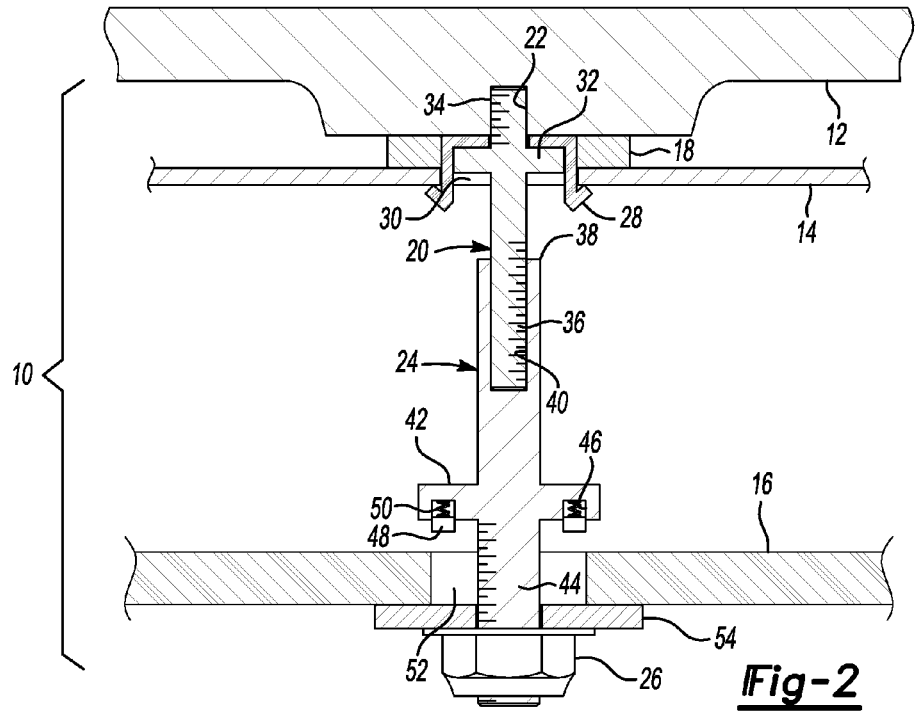
FIG. 2 is a cross-section view of the tower stud assembly in a contracted position.

Referring to FIG. 2, the tower stud assembly 10 is shown as it is initially assembled between the roof rack 12 and the sub-surface support 16. The tower stud assembly 10 is inserted through the hole 30 in the roof 14 with the upper collared stud 20 fully received in the reversely threaded bore 40 when initially inserted. When initially inserted, the tower stud assembly 10 does not include the prevailing torque nut 26 or the washer 54. The lower stud collar 42 is spaced from the sub-surface support 16 upon initial insertion. The seal 18 is not compressed and the clip 28 extends through the hole 30 and may engage a lower surface of the roof 14.

Figure 3:
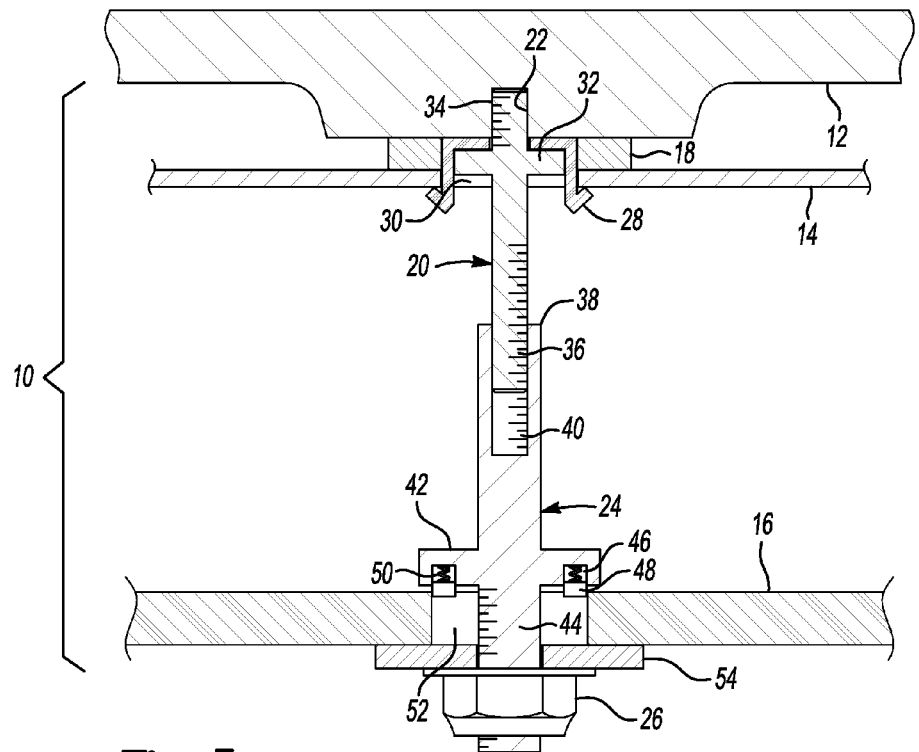
FIG. 3 is a cross-section view of the tower stud assembly in an extended position.

Referring to FIG. 3, the tower stud assembly 10 is shown at the point where the stops 48 engage the slot 52. The stops 48 ground the lower collared stud 24 to the sub-surface support 16. Prior to the stops 48 engaging the slot 52, the prevailing torque nut 26 rotates relative to the upper collared stud 20 and causes the upper collared stud 20 to be extended from the reversely threaded bore 40.

Once the stops 48 engage the slot 52, the lower collared stud 24 is grounded and prevented from rotating relative to the sub-surface support 16. The distance between the lower stud collar 42 and the sub-surface support 16 corresponds to the distance that the seal 18 is to be compressed between the roof rack 12 and the roof 14.

Referring to FIG. 4, the tower stud assembly 10 is shown fully assembled and secured to the roof 14 and the sub-surface support 16. The prevailing torque nut 26 is continued to be rotated after the stops engage the slot 52, but instead of extending the upper collared stud 20 further from the reversely threaded bore 40, the entire tower stud assembly 10 is drawn downwardly with the roof rack 12 compressing the seal 18 against the roof 14. Excessive tightening of the prevailing torque nut 26 is prevented by the lower stud collar 42 and washer 54 engaging opposite sides of the sub-surface support 16. This prevents the seal 18 from being overly compressed between the roof rack 12 and the roof 14.

The adjustable length of the tower stud assembly 10 is provided to accommodate manufacturing tolerances in the spacing between the roof 14 and the sub-surface support 16. Depending upon the spacing between the roof 14 and the sub-surface support 16, the upper collared stud 20 may be extended a variable distance from the reversely threaded bore 40.

The prevailing torque nut 26 may include a metal threaded nut that is connected by a cap to a nylon locking element, as is well known in the art. The prevailing torque nut 26 may be rotated at a first level of torque when initially assembled to the lower collared stud 24 to rotate the lower collared stud 24 in one direction. The reversely threaded connection is actuated to cause the upper collared stud 20 to be extended from the reversely threaded bore 40. After the stop 48 engages the slot 52, continued rotation at a second and higher level of torque. The continued rotation at a higher level of torque draws the tower stud assembly 10 downwardly until the lower stud collar 42 is drawn into engagement with the sub-surface 16.

Referring to FIG. 5, an alternative embodiment of a lower collared stud 60 is shown. It should be understood that the alternative lower collared stud 60 may be substituted for the lower collared stud 24 shown in FIGS. 1-4. A pair of leaf springs 62 are shown secured within a slot 64 formed in the lower stud collar 66. The leaf springs 62 function similar to the stops 48 as described with reference to FIGS. 1-4.

The leaf springs 62 are initially spaced from the sub-surface support 16 and are initially drawn downwardly as the upper collared stud 20 is extended from reversely threaded bore 40. The leaf springs 62 then contact the slot 52 in the sub-surface support 16 to ground the lower collared stud 60 relative to the sub-surface support 16. Continued rotation of the prevailing torque nut 26 causes the tower stud assembly 10, including the lower collared stud 60, into engagement with sub-surface support 16.

Referring to FIG. 6, another alternative embodiment of a lower collared stud 70 is illustrated that includes a plastic washer 72. The plastic washer 72 includes one or more molded stops 74. The plastic washer 72 is assembled to a lower surface 76 of a lower stud collar 78. The molded stops 74 function in a manner similar to the stops 48 described with reference to FIGS. 1-4.

The molded stops 74 are drawn down until they engage the slot 52, thereby grounding the lower collared stud 70 relative to the sub-surface support 16. Once the lower collared stud 70 is grounded, continued rotation of the prevailing torque nut 26 causes the lower stud collar 78 to be drawn toward the sub-surface support 16 until it contacts the sub-surface support 16.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A fastener assembly comprising:
    a panel defining an opening;
    an object having a receptacle;
    a first threaded stud having an upper shaft secured within the receptacle of the object and having a threaded lower shaft extending through the opening, the first threaded stud having a first collar intermediate the upper and lower shafts and which extends through the opening;
    a clip secured over the first collar and extending through the opening, the clip inhibiting rotation of the first threaded stud relative to the panel and retaining the object on the panel when the upper shaft is secured within the receptacle;
    a second stud having a lower threaded shaft and defining an upper threaded bore that receives the lower shaft of the first threaded stud, a second collar between the threaded shaft of the second stud and the threaded bore, and a grounding stop protruding from and below the second collar;
    a support defining a slot that receives the threaded shaft of the second stud; and
    a torque nut assembled to the threaded shaft of the second stud that, when rotated at a first level of torque, rotates the stud to extend the threaded stud from the threaded bore until the grounding stop is received in the slot and prevents rotation of the second stud relative to the support, and wherein continued rotation of the nut at a second higher level of torque draws the stud through the slot until the second collar contacts the support.

2. The fastener assembly of claim 1 further comprising a seal compressed between the object and the panel when after the stop engages the slot the continued rotation of the nut draws the object toward the panel.

3. The fastener assembly of claim 2 wherein the seal is compressed to a predetermined extent between the object and the panel, and the continued rotation of the nut draws the object toward the panel by the predetermined extent.

4. The fastener assembly of claim 1 wherein the threaded bore and the threaded shaft of the second stud are threaded in the opposite directions.

5. The fastener assembly of claim 1 wherein the upper shaft of the first stud comprises a threaded shaft that is received in a threaded receptacle defined by the object.

6. A combination of an object assembled to a panel and a support by a tower stud assembly comprising:
the panel defining an opening;
the object having a receptacle;
a first threaded stud having an upper shaft secured within the receptacle of the object and having a threaded lower shaft extending through the opening, the first threaded stud having a first collar intermediate the upper and lower shafts and which extends through the opening;
a clip secured over the first collar and extending through the opening, the clip inhibiting rotation of the first threaded stud relative to the panel and retaining the object on the panel when the upper shaft is secured within the receptacle:
a second stud having a lower threaded shaft and defining an upper threaded bore that receives the lower shaft of the first threaded stud, a second collar between the threaded shaft of the second stud and the threaded bore, and a grounding stop protruding from and below the second collar;
a support defining a slot that receives the threaded shaft of the second stud; and
a torque nut assembled to the threaded shaft of the second stud that, when rotated at a first level of torque, rotates the stud to extend the threaded stud from the threaded bore until the grounding stop is received in the slot and prevents rotation of the second stud relative to the support, and wherein continued rotation of the nut at a second higher level of torque draws the stud through the slot until the second collar contacts the support.

7. The combination of claim 6 further comprising a seal compressed between the object and the panel when after the stop engages the slot the continued rotation of the nut draws the object toward the panel.

8. The combination of claim 7 wherein the seal is compressed to a predetermined extent between the object and the panel, and wherein the continued rotation of the nut draws the object toward the panel to the predetermined extent.

9. The combination of claim 6 wherein a first threaded connection between the lower shaft of the first stud and the threaded bore of the second stud is threaded in a first rotary direction and the nut is connected to the threaded shaft of the second stud by a second threaded connection, wherein the first threaded connection and second threaded connection are threaded in opposite rotary directions.

* * * * *